(12) United States Patent
Yang et al.

(10) Patent No.: US 8,909,062 B2
(45) Date of Patent: Dec. 9, 2014

(54) OPTICAL SIGNAL REGENERATION AND AMPLIFICATION OF M-PSK AND M-QAM MODULATION FORMATS USING RECONFIGURABLE WAVELENGTH SELECTIVE PROCESSORS AND PHASE-SENSITIVE AMPLIFIERS

(75) Inventors: Jeng-yuan Yang, Garland, TX (US); Youichi Akasaka, Allen, TX (US); Motoyoshi Sekiya, Richardson, TX (US); Inwoong Kim, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 240 days.

(21) Appl. No.: 13/526,217

(22) Filed: Jun. 18, 2012

(65) Prior Publication Data

US 2013/0272702 A1 Oct. 17, 2013

Related U.S. Application Data

(60) Provisional application No. 61/623,922, filed on Apr. 13, 2012.

(51) Int. Cl.
*H04B 10/00* (2013.01)
*H01S 3/00* (2006.01)

(52) U.S. Cl.
USPC .......................... 398/175; 398/173; 359/333

(58) Field of Classification Search
CPC ........... H04B 10/2912; H04B 10/2563; H04B 10/291; H04B 10/2916; H04B 10/5057; H04B 10/572; H04B 10/0795; H04B 10/70; H04B 10/29; H04B 10/25; H04B 10/299; H01S 3/06783; H01S 3/06754; H01S 3/10076; H01S 3/1083; G02F 1/395; G02F 2001/392; G02F 1/3536; G02F 1/3532; G02F 2203/58; G02F 1/35; G02F 1/39; H04J 14/0212; H04J 14/0213; H04Q 11/0062; H03F 7/00

USPC .......................... 398/173–181; 359/333–349
See application file for complete search history.

(56) References Cited

U.S. PATENT DOCUMENTS

| | | | | |
|---|---|---|---|---|
| 5,253,104 A * | 10/1993 | Delavaux | ................. | 359/341.33 |
| 5,386,314 A * | 1/1995 | Jopson | ........................ | 359/326 |
| 5,400,164 A * | 3/1995 | Kurtzke et al. | ............... | 398/150 |
| 6,031,646 A * | 2/2000 | Sniadower | .................... | 398/157 |
| 6,529,314 B1 * | 3/2003 | Shukunami et al. | .......... | 359/332 |

(Continued)

OTHER PUBLICATIONS

Croussore, All-Optical Regeneration for Phase-Shift Keyed Optical Communication Systems, 2007, PhD Thesis, University of Central Florida, All Document.*
Slavik et al, All-optical phase and amplitude regenerator for nextgeneration telecommunications systems, 2010, Nat. Photonics, All Document.*
Sygletos et al, Phase Locking and Carrier Extraction Schemes for Phase Sensitive Amplification, 2010, Transparent Optical Networks, All Document.*

*Primary Examiner* — Ken Vanderpuye
*Assistant Examiner* — Dibson Sanchez
(74) *Attorney, Agent, or Firm* — Baker Botts L.L.P.

(57) ABSTRACT

A method for regenerating optical signal includes determining a source optical signal to be regenerated, adding a first pump optical signal and a second pump optical signal to the source optical signal to yield an intermediate optical signal, creating a first conjugate optical signal and a second conjugate optical signal from the intermediate optical signal, and performing degenerate phase-sensitive amplification utilizing the first conjugate optical signal, the second conjugate optical signal and the source optical signal to yield an output optical signal. The source optical signal is modulated with a multilevel modulation format. Each conjugate optical signal has a phase that is a conjugate of a multiple of the phase of the source optical signal.

24 Claims, 7 Drawing Sheets

(56) References Cited

U.S. PATENT DOCUMENTS

| | | | |
|---|---|---|---|
| 6,963,675 B2 * | 11/2005 | Watanabe | 385/11 |
| 7,164,526 B2 * | 1/2007 | McKinstrie et al. | 359/330 |
| 7,304,788 B2 * | 12/2007 | McKinstrie | 359/332 |
| 7,369,779 B1 * | 5/2008 | Croussore et al. | 398/176 |
| 7,483,203 B2 * | 1/2009 | McKinstrie | 359/333 |
| 8,032,024 B2 * | 10/2011 | Centanni et al. | 398/48 |
| 8,098,989 B2 * | 1/2012 | Yu | 398/65 |
| 2011/0176202 A1 * | 7/2011 | Kato et al. | 359/337.5 |
| 2013/0087689 A1 * | 4/2013 | Woodward et al. | 250/216 |
| 2013/0208334 A1 * | 8/2013 | Kakande et al. | 359/246 |
| 2013/0301661 A1 * | 11/2013 | Kakande et al. | 370/536 |

* cited by examiner

US 8,909,062 B2

OPTICAL SIGNAL REGENERATION AND AMPLIFICATION OF M-PSK AND M-QAM MODULATION FORMATS USING RECONFIGURABLE WAVELENGTH SELECTIVE PROCESSORS AND PHASE-SENSITIVE AMPLIFIERS

RELATED APPLICATION

This application claims the benefit under 35 U.S.C. §119 (e) of U.S. Provisional Application No. 61/623,922 filed Apr. 13, 2012 and entitled "Optical Signal Regeneration and Amplification of M-PSK Modulation Formats Using Reconfigurable Wavelength-Selective Processors and Phase-Sensitive Amplifiers."

TECHNICAL FIELD OF THE INVENTION

The present invention relates generally to optical communication networks and, more particularly, to optical signal regeneration and amplification of m-PSK and m-QAM modulation formats using reconfigurable wavelength selective processors and phase-sensitive amplifiers.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. Optical networks often employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave. The information may be conveyed by modulating the phase of the signal itself using differential phase-shift keying ("DPSK").

In QAM, the information carried by the optical signal may be conveyed by modulating both the amplitude and phase of the carrier wave. PSK may be considered a subset of QAM, wherein the amplitude of the carrier waves are maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant powers for all symbols. QAM signals may have the same angular arrangement as that of PSK signals, but include different amplitude arrangement. QAM signals may have its symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or 0 and $\pi$) on the constellation diagram; quadrature PSK ("QPSK", "4-PSK", or "4-QAM") using four phases at 0°, 90°, 180°, and 270° (or 0, $\pi/2$, $\pi$, and $3\pi/2$); eight-phase PSK ("8-PSK") and QAM ("8-QAM") using eight phases at 0°, 45°, 90°, 135°, 180°, 225°, 270°, and 315° (or 0, $\pi/4$, $\pi/2$, $3\pi/4$, $\pi$, $5\pi/4$, $3\pi/2$, and $7\pi/4$); and sixteen-phase PSK ("16-PSK") and QAM ("16-QAM") using sixteen phases at 0°, 22.5°, 45°, 67.5°, 90°, 112.5°, 135°, 157.5°, 180°, 202.5°, 225°, 247.5°, 270°, 292.5°, 315°, and 337.5° (or 0, $\pi/8$, $\pi/4$, $3\pi/8$, $\pi/2$, $5\pi/8$, $3\pi/4$, $7\pi/8$, $\pi$, $9\pi/8$, $5\pi/4$, $11\pi/8$, $3\pi/2$, $13\pi/8$, $7\pi/4$, and $15\pi/8$).

Phases in such signals may be offset. Each of 2-PSK, 4-PSK, 8-PSK and 16-PSK signals may be arranged in one circle on the constellation diagram. 8-QAM signals may be arranged in two circles and 16-QAM is arranged in three circles.

M-PSK and m-QAM signals may also be polarized using techniques such as dual-polarization QPSK ("DPQPSK"), wherein separate m-PSK signals are multiplexed by orthogonally polarizing the signals.

SUMMARY

In one embodiment, a method for regenerating optical signal includes determining a source optical signal to be regenerated, adding a first pump optical signal and a second pump optical signal to the source optical signal to yield an intermediate optical signal, creating a first conjugate optical signal and a second conjugate optical signal from the intermediate optical signal, and performing degenerate phase-sensitive amplification utilizing the first conjugate optical signal, the second conjugate optical signal and the source optical signal to yield an output optical signal. The source optical signal is modulated with a multilevel modulation format. Each conjugate optical signal has a phase that is a conjugate of the phase of the source optical signal.

In another embodiment, a system for regenerating optical signals includes an input configured to accept a source optical signal modulated using a multilevel modulation format, a dual-pump source configured to generate a first pump optical signal and a second pump optical signal, a coupler communicatively coupled to the input and the dual-pump source configured to add the first pump optical signal and the second pump optical signal to the source optical signal to yield an intermediate optical signal, a wavelength selective switch, a first non-linear optical element communicatively coupled at two ends to the wavelength selective processor, and a second non-linear element communicatively coupled to the wavelength selective processor. The wavelength selective processor is configured to send a plurality of portions of the intermediate optical signal through the first non-linear optical element in opposite directions. The first non-linear optical element is configured to create a first conjugate optical signal and a second conjugate optical signal from the portions of the intermediate optical signal. Each conjugate optical signal has a phase that is a conjugate of the phase of the source optical signal. The second non-linear optical element is configured to perform degenerate phase-sensitive amplification utilizing the first conjugate optical signal, the second conjugate optical signal and the source optical signal to yield an output optical signal. The wavelength selective processor includes a wavelength selective switch.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
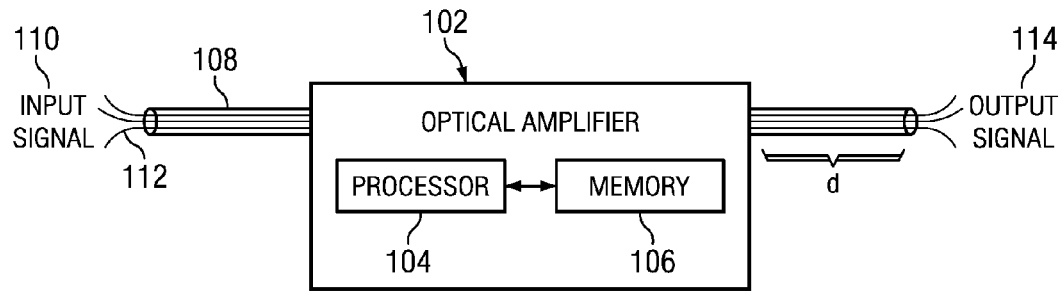
FIG. 1 illustrates an example embodiment of a system configured for optical signal regeneration and amplification of m-PSK and m-QAM modulation formats.

FIG. 1 illustrates an example embodiment of a system 100 configured for optical signal regeneration and amplification of m-PSK and m-QAM modulation formats. In one embodiment, system 100 may use wavelength selective processors to conduct such optical signal regeneration and amplification. In a further embodiment, such wavelength selective processors may be reconfigurable. In another embodiment, system 100 may use phase-sensitive amplification to conduct such optical signal regeneration and amplification. In a further embodiment, such phase-sensitive amplification may be degenerate. The optical signal regeneration and amplification of m-PSK and m-QAM modulation formats may be conducted by one or more optical amplifiers, such as optical amplifier 102.

Optical amplifier 102 may be configured to regenerate and amplify optical signals in system 100. System 100 may include an input signal 110 to be regenerated and amplified as output signal 114 by optical amplifier 102. Signals may be transmitted in system 100 over an optical network 108, which may include one or more optical fibers 112 of any suitable type. System 100 may include optical amplifier 102 in any suitable portion of system 100 or an optical network, such as in a transmission line between two optical components or in a reconfigurable optical add-drop multiplexer ("ROADM"). Furthermore, optical amplifier 102 may be configured to operate as a stand-alone device or as part of another piece of optical transmission equipment. Optical amplifier 102 may be placed a distance d from a subsequent piece of optical equipment.

Figure 2:
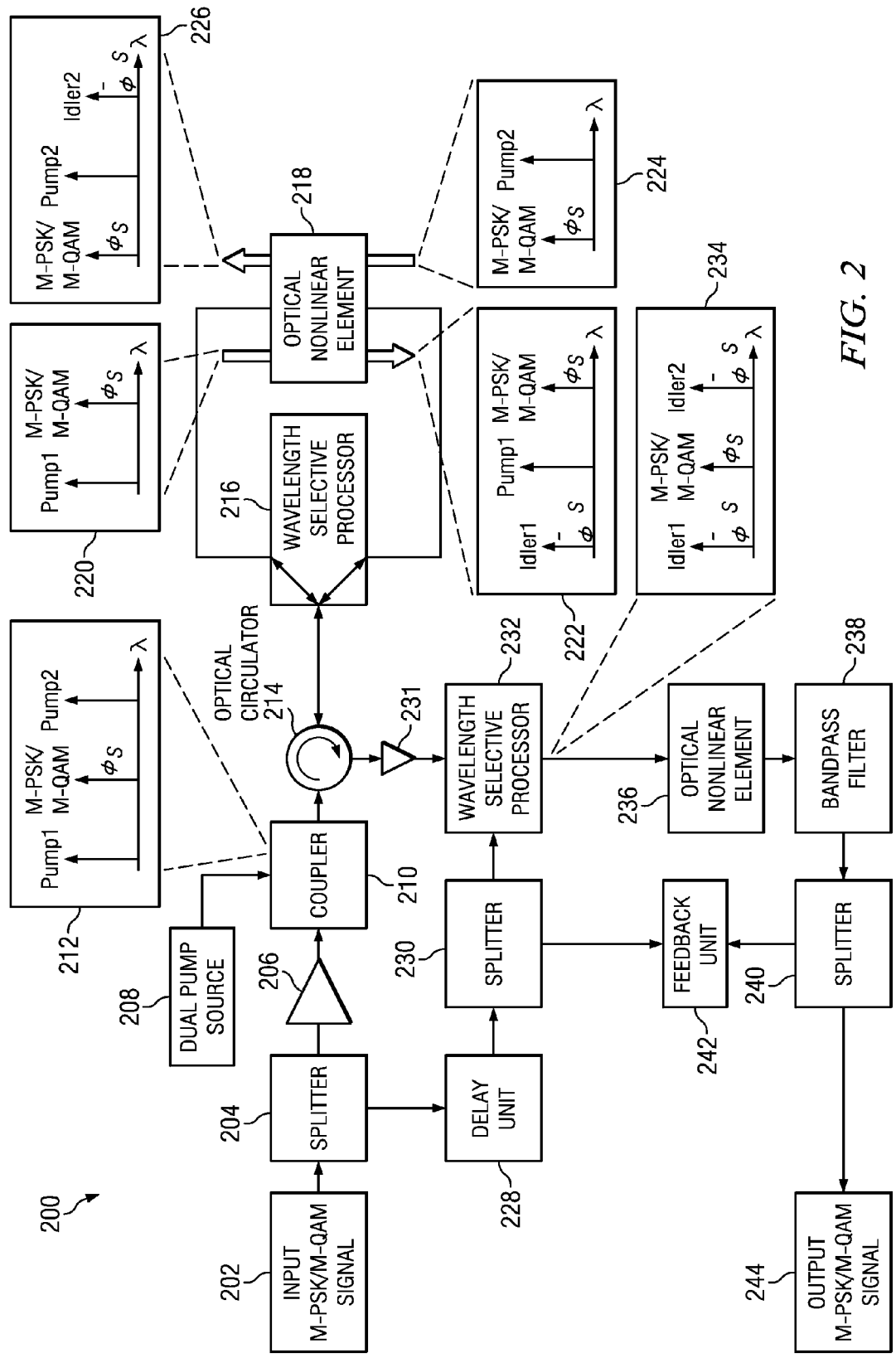
FIG. 2 is an illustration of an example embodiment of an optical amplifier.
Figure 6:
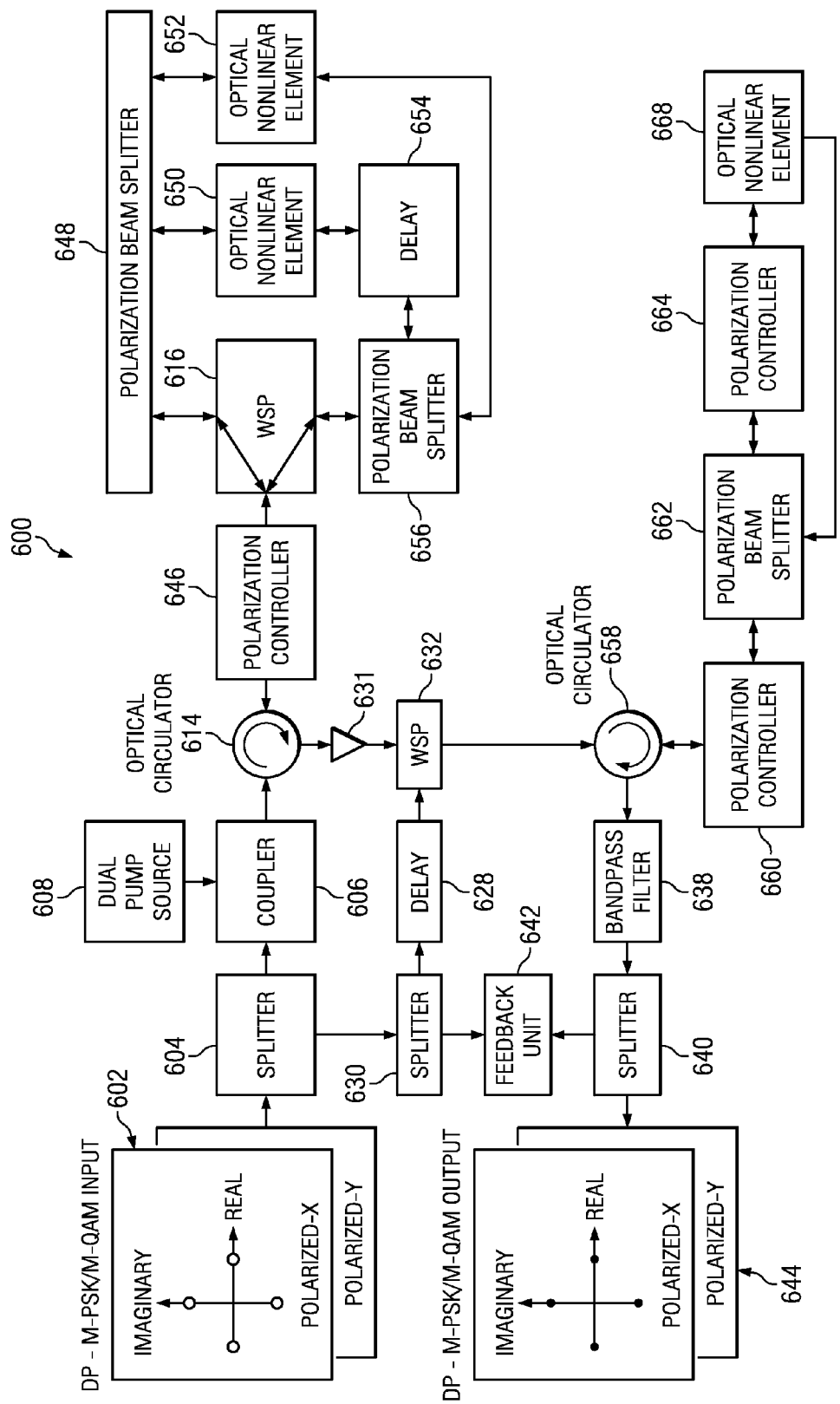
FIG. 6 is an illustration of an example embodiment of an optical amplifier.
Figure 7:
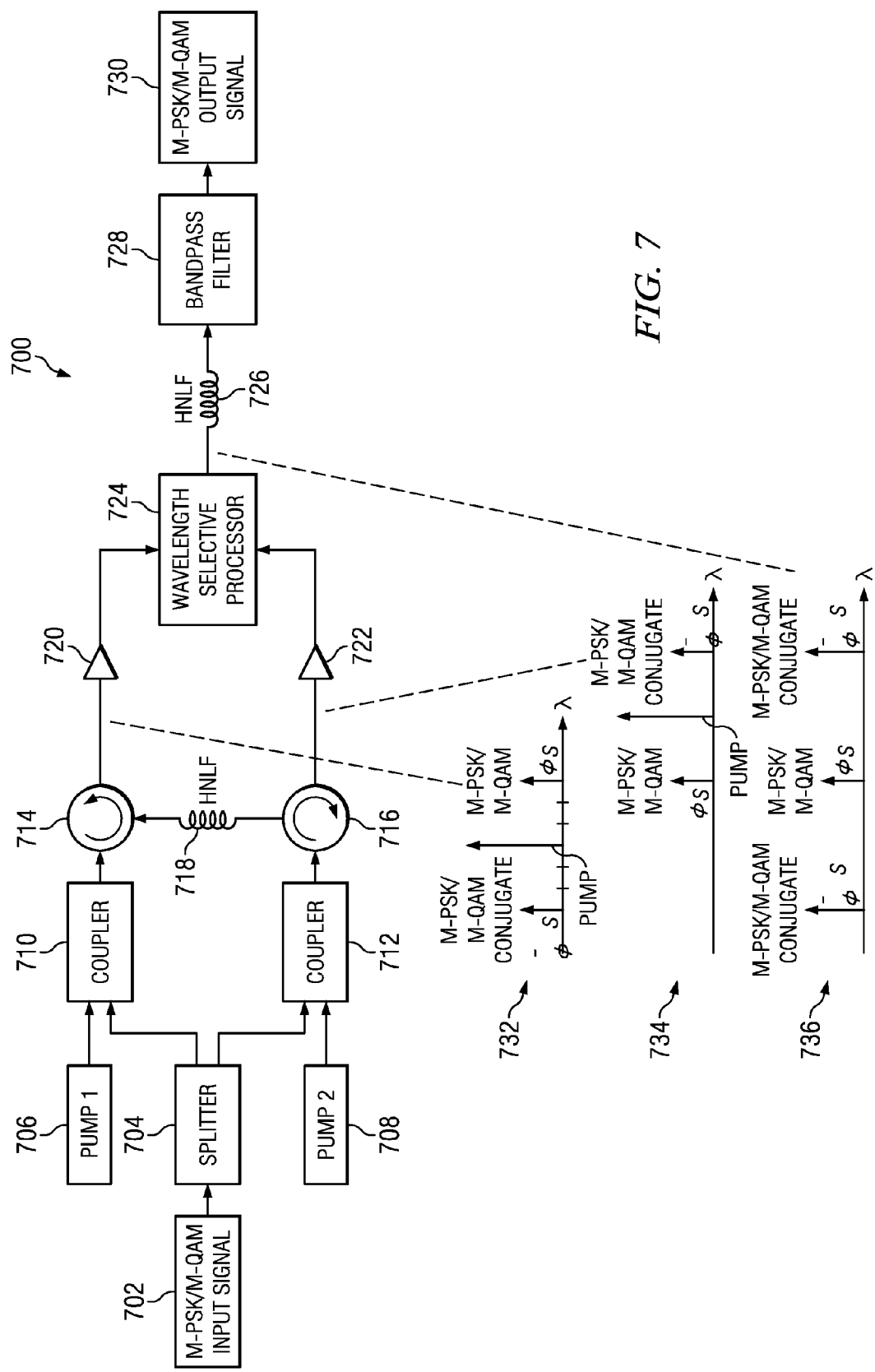
FIG. 7 is an illustration of another example embodiment of an optical amplifier.

Optical amplifier 102 may include any suitable number and kind of components configured to perform optical signal regeneration and amplification as described herein. Example implementations of all or part of optical amplifier 102 may include amplifiers 200, 600, and 700 as shown in FIGS. 2, 6, and 7, respectively. Optical amplifier 102 may include a processor 104 coupled to a memory 106. In one embodiment, to perform optical signal regeneration and amplification, optical amplifier 102 may include components for configuring optical amplifier 102 to generate phase conjugates of an optical signal to be regenerated and amplified. In a further embodiment, optical amplifier 102 may include components for configuring optical amplifier 102 to generate such conjugate signals in two directions and add them. In another embodiment, optical amplifier 102 may include components for configuring optical amplifier to conduct dual-pump degenerate phase-sensitive amplification.

Specifically, in one embodiment optical amplifier 102 may be configured to generate two first-order conjugates of a signal such as input signal 110. The conjugates may be arranged symmetrically around input signal 110. Optical amplifier 102 may generate pump laser signals, which may be used to create idler signals. The resulting input signal and idler signals may become degenerate after wave mixing. Optical amplifier 102 may be configured to conduct four-wave mixing ("FWM") which amplifies input signal 110 and accepts the symmetric idler signals. The phases of the pump signals may match and thus cause conjugates of the phase of input signal 110. The wavelengths of the pump and idler signals may be equidistant (or nearly equidistant) from the wavelength of input signal 110. Optical amplifier 110 may be configured to apply FWM to input signal 110 and to the conjugate signals and thus reduce the phase noise on the symbols of input signal 110. The equidistant or nearly equidistant wavelengths may include wavelengths that are, for example, perfectly equidistant or approximately equidistant such that overall performance is not impacted significantly. Such approximately equidistant wavelengths may include wavelength differences between the idler signals and input signal 110 that are approximately equal, or wavelength differences between the pump signals and input signal that are approximately equal. In one embodiment, approximately equal wavelength differences may include wavelength differences that vary less than ten percent of in terms of wavelength in relation to the wavelength of input signal 110.

Input signal 110 may include an optical signal modulated through any suitable m-PSK or m-QAM technique, such as QPSK, 8-PSK, 16-PSK, 8-QAM, 16-QAM, dual-polarization, or any suitable combination thereof. 8-QAM and 8-PSK signals may include the same angle deviations between two types of signals. Likewise, 16-QAM and 16-PSK signals may include the same angle deviations between the two types of signals. System 100 may be able to amplify both 8-QAM and 8-PSK signals using the same or similar configuration. Likewise, system 100 may be able to amplify both 16-QAM and 16-PSK signals using the same or similar configuration.

Processor 104 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in memory 106 to carry out some or all of the operation of optical amplifier 102. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media). Memory 106 may be non-transitory.

Optical network 108 may include one or more optical fibers 112 operable to transport one or more optical signals communicated by components of the optical network 108. Optical network 108 may be, for example, a point-to-point optical network with terminal nodes, a ring optical network, a mesh optical network, or any other suitable optical network or combination of optical networks. Optical network 108 may be used in a short-haul metropolitan network, a long-haul inter-city network, or any other suitable network or combination of networks. The capacity of optical network 108 may include, for example, 100G, 400G, or 1T. Optical fibers 112 may include any suitable type of fiber, such as a Single-Mode Fiber ("SMF"), Enhanced Large Effective Area Fiber ("E-LEAF"), or TrueWave® Reduced Slope ("TW-RS") fiber. Optical network 108 may include devices, such as optical amplifier 102, operable to transmit optical signals over optical fibers 112. Information may be transmitted and received through optical network 108 by modulation of one or more wavelengths of light to encode the information on the wavelength.

In operation, optical amplifier 102 may be operating on optical network 108. An input signal 110 may arrive on optical network 108 through fibers 112. Optical amplifier may regenerate and amplify input signal 110 and output the result as output signal 114.

To regenerate and amplify input signal 110, optical amplifier 102 may generate signals with conjugate phase of input signal 110. The specific method of generating conjugate signals may depend upon the modulation technique used by input signal 110. The conjugate signals may be equidistant (or nearly equidistant) from input signal 110 in terms of wavelength and may have the negative phase of input signal 110. Optical amplifier 102 may apply the conjugate signals of input signal 110 to degenerate phase-sensitive amplification. Such amplification may be conducted using FWM.

Some methods of regenerating a signal to overcome phase noise may include optical-electrical-optical ("OEO") regeneration methods. Such methods may include, for example, converting optical signals into electronic signals. Such conversion may occur after demultiplexing. The electronic signals may be switched and then converted back into optical signals, which may then be multiplexed onto optical networks. In one embodiment, optical amplifier 102 may not use OEO regeneration methods. In another embodiment, optical amplifier 102 may regenerate a received signal using optical mechanisms and without converting the information in the optical mechanisms to electronic format.

FIG. 2 is an illustration of an example embodiment of an optical amplifier 200. Optical amplifier 200 may implement fully or in part optical amplifier 102 of FIG. 1.

Optical amplifier 200 may include first stage for generating conjugate signals for an input signal. The first stage may include a mechanism for accepting an input signal such as input m-PSK/m-QAM signal 202. The input signal may be coupled to splitter 204, which may include outputs coupled to an amplifier 206 and to a delay unit 228. The output of amplifier 206 may be coupled to a coupler 210. Further, optical amplifier 200 may include a dual pump source 208 coupled to couple 210. Coupler 210 may be configured to couple the outputs of optical amplifier 200 and dual pump source 208 and provide the output to optical circulator 214, which may be coupled on a first input/output line to a wavelength selective processor 216 and on a second input/output line to a second stage, including a wavelength selective processor 232. Wavelength selective processor 216 may be coupled through two outputs to either end of an optical nonlinear element 218.

Optical amplifier 200 may include a second stage for performing degenerate phase-sensitive amplification, including splitter 230 coupled to the output of delay unit 228. The output of splitter 230 may be coupled to feedback unit 242 and to wavelength selective processor 232. The output of wavelength selective processor 232 may be coupled to optical nonlinear element 236, which may be coupled to bandpass filter 238, which may be coupled to splitter 240. A first output of splitter 240 may be coupled to feedback unit 242 and to output m-PSK/m-QAM signal 244. Output m-PSK/m-QAM signal 244 may implement fully or in part output signal 114 of FIG. 1.

Input m-PSK/m-QAM signal 202 and output m-PSK/m-QAM signal 244 may include, for example, optical signals modulated using QPSK, 8-PSK, 16-PSK, 8-QAM, or 16-QAM. Input m-PSK/m-QAM signal 202 may include data information of a certain phase $\phi_s$ that is a function of time and where "s" denotes the order of the data symbols.

Splitters 204, 230, 240 may include any suitable beam splitter or other device for splitting an optical signal, such as input m-PSK/m-QAM signal 202, into two or more resultant optical signals. Amplifiers 206, 231 may include any suitable mechanism for boosting the power of the received optical signal. Amplifiers 206, 231 may include an optical fiber doped with a rare-earth element. When a signal passes through the fiber, external energy may be applied to excite the atoms of the doped portion of the optical fiber, which increases the intensity of the optical signal. As an example, amplifiers 206, 231 may include an erbium-doped fiber amplifier ("EDFA"). Optical coupler 210 may include any suitable mechanism for joining the optical signals from two or more inputs.

Optical circulator 214 may include any suitable mechanism for selective routing of inputs and outputs according to the present disclosure. For example, optical circulator 214 may include a plurality of sequentially identified optical input-output ports and may allow light to travel in only one direction. An optical signal entered into a first port will exit the second port, while a signal entering the second port will exit the third port. The sequential identification of the first, second, and third port, and thus the input-output behavior, may be schematically indentified with a clockwise or counter-clockwise indicator. In the example of FIG. 2, optical circulator may operate in clockwise fashion such that the input from coupler 210 is output to wavelength selective processor 216, and input from wavelength selective processor 216 is output to wavelength selective processor 232.

Dual-pump source 208 may include any suitable mechanism for outputting two optical pump signals of given wavelengths and frequencies. Dual-pump source 208 may be implemented with configurable laser sources. The configuration of dual-pump source 208 may be set by a processor of amplifier 200, such as that represented as processor 104 in FIG. 1. Dual-pump source 208 may be configured to respond to the specific kind of input m-PSK/m-QAM signal 202 received by amplifier 200. Furthermore, dual-pump source 208 may be configured to be adjusted in response to determinations of errors or noise made by feedback unit 242.

In one embodiment, dual-pump source 208 may be configured to produce two pump signals that are symmetrically located on each side of a signal to be amplified, such as input m-PSK/m-QAM signal 202. Each pump signal may be equidistant, or approximately equidistant, from the source signal in terms of wavelength. In another embodiment, each of the pump signals may have exactly the same phase. In a further embodiment, each of the pump signals may have a phase of zero. An example output of coupling the dual-pump signals and the original source signal may be illustrated in diagram 212. This output may be routed to wavelength selective processor 216. In one example, each pump of dual-pump source 208 may have a 400-mW power and 350-GHz spacing.

Wavelength selective processors 216, 232 may include one or more wavelength selective switches configured to perform optical switching. Such wavelength selective switches may be implemented by any suitable mechanism, including optical components, for conducting such optical switching. Furthermore, wavelength selective processors 216, 232 may include modules, circuitry, or software configured to adjust phase and power levels of components of signals. In addition, wavelength selective processors 216, 232 may include automation software configured to control the operation of wavelength selective switches. Any suitable automation software may be used. The automation software may include instructions resident upon a computer-readable medium for execution by a processor. Wavelength selective processors 216, 232 may include a microprocessor, microcontroller, DSP, ASIC, or any other digital or analog circuitry for executing the instructions resident upon a computer-readable medium or for otherwise performing control of wavelength selective switches. Wavelength selective processors 216, 232, may be implemented on the same or different mechanisms, on one or more such mechanisms, and some or all of the functionality of each may be implemented by the other. Wavelength selective processor 216 may be configured to divide its input into two signals, each with the m-PSK/m-QAM signal and a single pump signal. For example, wavelength selective processor 216 may produce the output shown in diagram 220 onto one branch of input to optical nonlinear element 218—including the m-PSK/m-QAM signal and the lower pump signal—and produce the output shown in diagram 224 onto the other branch of input to optical nonlinear element 218—including the m-PSK/m-QAM signal and the upper pump signal.

Wavelength selective processors 216, 232 may be configurable to handle a variety of types of high-level modulation formats, such as QPSK, 8-PSK, 16-PSK, 8-QAM, and 16-QAM. To conduct such handling, wavelength selective processors 216, 232 may be configured to determine the type of signal to be handled through, for example, analyzing signal, referencing user settings, or referencing system settings. Using different modes of operation, wavelength selective processors 216, 232 may variably determine and apply different idler or conjugate signals to be used in conjunction with a given m-PSK or m-QAM signal. Furthermore, wavelength selective processors 216, 232 may be configured to filter unused idler or conjugate signals, based on the type of signal in use.

Optical nonlinear element 218 may be configured to bi-directionally convert wavelength. Accordingly, optical nonlinear element 218 may be configured to cause the creation of idler signals with a conjugate value of the phase of the signal. The idler signal may be equidistant, or approximately equidistant, to the pump signal as the signal in terms of wavelength. The conjugate value of the phase of the signal may include, for example, $-\phi_s$, $-3\phi_s$, and $-7\phi_s$, depending upon whether QPSK, 8-PSK, 16-PSK, 8-QAM, or 16-QAM is used. Optical nonlinear element 218 may be implemented by any suitable mechanism. In one embodiment, any nonlinear element that can support bi-directional propagation and non-linear processing may be used. For example, optical nonlinear element 218 may include an optical, highly nonlinear fiber ("HNLF") of length of two hundred meters, nonlinear coefficient ($\gamma=9.2$ (1/W·km)), dispersion slope (S=0.018 ps/km/nm$^2$), and zero-dispersion wavelength ("ZDW") at 1550 nm. In another example, optical nonlinear element 218 may include waveguides configured to produce the desired output. In yet other examples, optical nonlinear element 218 may include a silicon waveguide, III-V waveguide, or periodically poled Lithium Niobate ("PPLN"). The output of optical nonlinear element 218 may be illustrated in diagrams 222, 226. In diagram 222, an idler signal may be produced with a wavelength less than the first pump signal, separated by the same (or nearly the same) wavelength difference as that which separates the pump signal and the m-PSK/m-QAM signal. The phase of the idler signal may be the conjugate of the phase of the m-PSK/m-QAM signal. Similarly, in diagram 226, an idler signal may be produced with a wavelength greater than the second pump signal, separated by the same (or nearly the same) wavelength difference as that which separates the pump signal and the m-PSK/m-QAM signal. The phase of the idler signal may be the conjugate of the phase of the m-PSK/m-QAM signal.

The combination of wavelength selective processor 216 and optical nonlinear element 218 may be bi-directional in that signals pass from wavelength selective processor 216 to optical nonlinear element 218 and back to wavelength selective processor 216 in both directions (clockwise and counter-clockwise).

Wavelength selective processor 216 may be configured to couple the outputs of optical nonlinear element 218 and selectively block or filter the pump signals. Wavelength selective processor 216 may be configured to send the resultant signal to the second stage, beginning with wavelength selective processor 232, by way of optical circulator 214 and amplifier 231.

Wavelength selective processor 232 may be configured to block or filter the m-PSK/m-QAM portion of the received signal. The m-PSK/m-QAM portion of the received signal may have experienced interference. Furthermore, wavelength selective processor 232 may be configured to otherwise allow the received signal, including the idler signals. Subsequently, wavelength selective processor 232 may be configured to add the original m-PSK/m-QAM signal (which may have been appropriately delayed by delay unit 228). The power and phase levels of the m-PSK/m-QAM signal and the associated idler signals may be adjusted by wavelength selective processor 232. The resulting signal may be illustrated in diagram 234, wherein the idler signals are equidistant (or nearly equidistant) from the m-PSK/m-QAM signal in terms of wavelength and contain conjugates of the phase of the m-PSK/m-QAM signal. Wavelength selective processor 232 may be configured to pass the resultant signal to optical nonlinear element 236.

Optical nonlinear element 236 may be configured to cause FWM among the elements of the signal shown in diagram 234. Because the signal contains two such idler signals, the FWM may be dual-pump. The FWM may cause regeneration of the m-PSK signal/m-QAM and reduction of the associated noise and errors associated with phase and amplitude. Furthermore, the m-PSK/m-QAM signal may thus also be optically amplified. Optical nonlinear element 236 may be implemented by any suitable mechanism. In one embodiment, any nonlinear element that can support nonlinear processing may be used. For example, by an optical, highly nonlinear fiber ("HNLF") of length of two hundred meters, nonlinear coefficient ($\gamma=9.2$ (1/W·km)), dispersion slope (S=0.018 ps/km/nm$^2$), and zero-dispersion wavelength ("ZDW") at 1550 nm. In another example, optical nonlinear element 218 may include waveguides configured to produce the desired output. In yet other examples, optical nonlinear element 218 may include a silicon waveguide, III-V waveguide, or periodically poled Lithium Niobate (PPLN).

Bandpass filter 238 may be configured to remove the idler signals from the result of FWM by only allowing signals with the wavelength of the original m-PSK/m-QAM signal to pass. Optical amplifier 200 may be configured to pass the resulting signal through splitter 240 in order to provide signal information to feedback unit 242 and to output the resulting signal as output m-PSK/m-QAM signal 244.

In operation, input m-PSK/m-QAM signal 202 may be received by optical amplifier 200 and split by splitter 204. One such resultant signal may be sent to amplifier 206 and another such resultant signal may be sent to delay unit 228, which may delay the signal to synchronize with the arrival of the idler signals at wavelength selective processor 232. In addition, the resultant signal may be further split by splitter 230, wherein one such further resultant signal is sent to feedback unit 242 and another such further resultant signal is sent to wavelength selective processor 232.

Amplifier 206 may amplify input m-PSK/m-QAM signal 202 and pass it to coupler 210, which may join the resultant signal and dual pump signals from dual pump source 208. The dual pump signals may be symmetrically equidistant (or nearly equidistant) in terms of wavelength from the m-PSK/m-QAM signal. In one embodiment, the dual pump signals have phase components of zero. The m-PSK/m-QAM signal and pump signals may be routed by optical circulator 214 to wavelength selective processor 216.

Wavelength selective processor 216 may separate the signal according to bandwidth, sending the m-PSK/m-QAM signal and upper pump signal to one input of optical nonlinear element 218 and the m-PSK/m-QAM signal and lower pump signal to the other input. Optical nonlinear element 218 may convert the wavelengths of each such signal combination such that one or more idler signals are added to each of the pump combinations. The idler signals may be equidistant (or nearly equidistant) from the pump signals as the m-PSK/m-QAM signal (in terms of wavelength) and continue in decreasing amplitude as the wavelength moves away from the m-PSK/m-QAM signal. Each such idler signal may have a different conjugate of the phase of the m-PSK/m-QAM signal. Such conjugates may be expressed in terms of a multiple of the m-PSK/m-QAM signal phase, such as $-\phi_s$, $-2\phi_s$, etc.

The specific idler and thus conjugate to be used may be selected according to the modulation technique used in conjunction with the m-PSK/m-QAM signal. Wavelength selective processor 216 may perform such selection by filtering or blocking all other idler signals and pump signals in the signal combination received from optical nonlinear element 236, leaving only the m-PSK/m-QAM signal and the pair of symmetric idler signals with conjugate phases to the m-PSK/m-QAM signal. In one embodiment, wavelength selective processor 216 may further block the m-PSK/m-QAM signal.

Wavelength selective processor 216 may pass the resultant signal to wavelength selective processor 232 through optical circulator 214. Wavelength selective processor 232 may block the m-PSK/m-QAM signal portion and couple the original m-PSK/m-QAM signal received from splitter 230. Wavelength selective processor 232 may send the resultant signal to optical nonlinear element 236.

In optical nonlinear element 236, the idler signals may serve as a dual-pump source. Further, optical nonlinear element 236 may conduct phase-sensitive amplification on the m-PSK/m-QAM signal. The phase-sensitive amplification may be degenerate. In addition, optical nonlinear element 236 may conduct FWM.

After the signal has been amplified and phase noise reduced, bandpass filter 238 may remove the pump signals and send the signal to output m-PSK/m-QAM signal 244.

Splitter 240 may split the signal and route it to the output as well as feedback unit 242.

Feedback unit 242 may be operable to provide various signal, noise, and error information to wavelength selective processors 216, 232. Wavelength selective processors 216, 232 may be configurable both in terms of type of input signal as well as in ability to compensate for determined errors and maximizing amplification and signal regeneration. For example, wavelength selective processors 216, 232 may compensate for residual chromatic dispersion in m-PSK/m-QAM input signal 202. Furthermore, wavelength selective processors 216, 232 may compensate for errors or noise introduced by optical amplifier 200 itself and the dispersion resulting from the dispersion slope of its nonlinear optical elements 218, 236. In addition, wavelength selective processors 216, 232 may adjust the m-PSK/m-QAM signal phase and power levels to optimally match the operation of phase-sensitive amplification. The information captured by feedback unit may include real-time input and output information, wavelength, power, residual chromatic dispersion, optical signal-to-noise ratio and other potential impairments. Wavelength selective processors 216, 232 may be configured to make the adjustments described above based on these observations.

Figure 3:
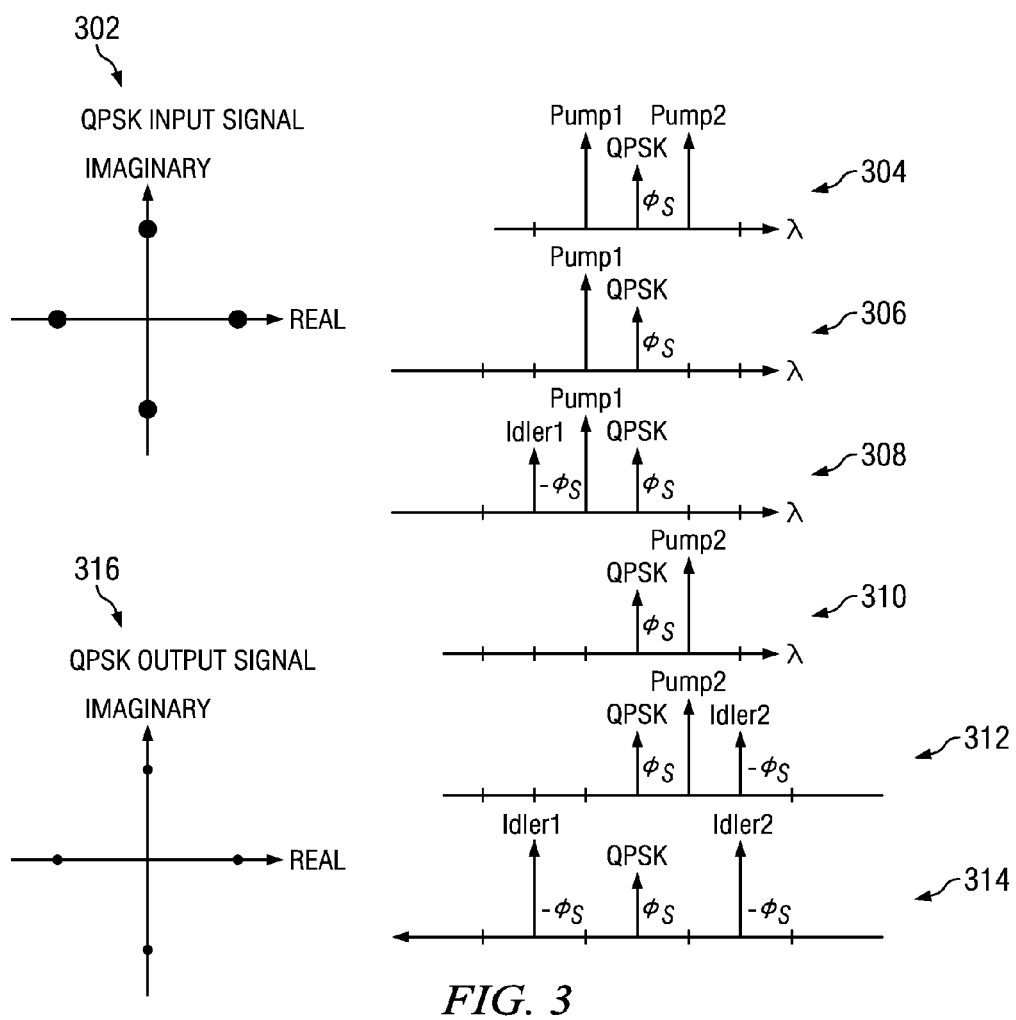
FIG. 3 is a more detailed illustration of the operation of an optical amplifier using a QPSK input signal.

FIG. 3 is a more detailed illustration of the operation of optical amplifier 200 using a QPSK input signal. QPSK input signal 302 may implement input m-PSK/m-QAM signal 202 and its phases are shown via a constellation diagram. The large ranges shown on QPSK input signal 302 on each of the signal symbols indicate noise and errors associated with the phases and amplitudes. Diagrams 304, 306, 308, 310, 312, 314 may illustrate diagrams 212, 220, 222, 224, 226, 234, respectively, when using QPSK input signals in optical amplifier 200.

Diagram 304 illustrates that Pump1 signal and Pump2 signal are equidistant (or nearly equidistant) from and symmetric around QPSK, which includes a phase $\phi_s$. After being selected by wavelength selective processor 216, diagram 306 illustrates that Pump1 and QPSK are selected to be passed through optical nonlinear element 218. Upon passing through optical nonlinear element 218, diagram 308 illustrates that an Idler1 signal has been added to the resultant signal. The Idler1 signal and the QPSK signal are equidistant (or nearly equidistant) from the Pump1 signal. The Idler1 signal has a conjugate phase, $-\phi_s$, with respect to the QPSK signal phase. The conjugate phase, $-\phi_s$, may be created by FWM through optical nonlinear element 218. In such FWM, the phase of Idler1 is given by $$\phi_{Idler1} = \phi_{Pump1} + \phi_{Pump1} - \phi_{m\text{-}PSK\ signal} = 0 - 0 - \phi_s = -\phi_s$$

Such a result may derive from the absence of phases of the pump signals. Similar computations may be made for Idler2.

Additional idler signals, with possibly other conjugate phases, may be produced by optical nonlinear element 218 but are not shown in diagram 308. Such idler signals would have shorter wavelengths than Idler1 and phase conjugates, which may be inappropriate for QPSK regeneration and amplification. The selection of the idler signals may depend upon the specific type of m-PSK/m-QAM modulation used to transmit information. In one embodiment, the first idler signals, with conjugate phase $-\phi_s$, may be used in conjunction with QPSK modulation.

Further, after being selected by wavelength selective processor 216, diagram 310 illustrates that Pump2 and QPSK are selected to be passed through optical nonlinear element 218. Upon passing through optical nonlinear element 218, diagram 312 illustrates that an Idler2 signal has been added to the resultant signal. The Idler2 signal and the QPSK signal are equidistant (or nearly equidistant) from the Pump2 signal. The Idler2 signal has a conjugate phase, $-\phi_s$, with respect to the QPSK signal phase. Additional idler signals, with possibly other conjugate phases, may be produced by optical nonlinear element 218 but are not shown in diagram 312. Such idler signals would have longer wavelengths than Idler2 and phase conjugates, which may be inappropriate for QPSK regeneration and amplification.

Diagram 314 illustrates the result of adding the resultant signals and selectively blocking the original pump signals and other unused idler signals. Diagram 314 may be the result of the operation of wavelength selective processor 216 and wavelength selective processor 232. In one embodiment, the QPSK signal may have been filtered from the resultant signal and the original signal added. The idler signals may maintain their equidistant (or nearly equidistant) and symmetric spacing with respect to the QPSK signal and their conjugate phases.

QPSK output signal 316 illustrates the result of passing the resultant signal through optical nonlinear element 236 for FWM for dual-pump, degenerate phase-sensitive amplification. The phase of the regenerated QPSK signal, as a result of degenerate FWM, may be given by $$\phi_{QPSK\_Regenerated} = \phi_{QPSK} + \phi_{QPSK} - \phi_{Idler1} - \phi_{Idler2} = \phi_s + \phi_s - (-\phi_s) - (-\phi_s) = 4\phi_s$$

Accordingly, this meets the phase condition for phase regeneration of QPSK, wherein $4\phi_s = n \times 2\pi$, where $\phi_s$ (t): $\{0, \pi/2, \pi, 3\pi/2\}$. By providing conjugate signals with phase $-\phi_s$, phase regeneration may be accomplished for QPSK. Similarly, when using 8-PSK or 8-QAM techniques, the described conjugate signals with phase $-3\phi_s$ may successfully accomplish phase regeneration through FWM, since $$\phi_{8\text{-}PSK\_Regenerated} = \phi_{8\text{-}PSK} + \phi_{8\text{-}PSK} - \phi_{Idler1} - \phi_{Idler2} = \phi_s + \phi_s - (-3\phi_s) - (-3\phi_s) = 8\phi_s$$

wherein $8\phi_s = n \times 2\pi$ and $\phi_s$ (t): $\{0, \pi/4, \pi/2, 3\pi/4, \pi, 5\pi/4, 3\pi/2, 7\pi/4\}$. Similarly, when using 16-PSK or 16-QAM techniques, the described conjugate signals with phase $-7\phi_s$ may successfully accomplish phase regeneration through FWM, since $$\phi_{16\text{-}PSK\_Regenerated} = \phi_{16\text{-}PSK} + \phi_{16\text{-}PSK} - \phi_{Idler1} - \phi_{Idler2} = \phi_s + \phi_s - (-7\phi_s) - (-7\phi_s) = 16\phi_s$$

wherein $16\phi_s = n \times 2\pi$ and $\phi_s$ (t): $\{0, \pi/8, \pi/4, 3\pi/8, \pi/2, 5\pi/8, 3\pi/4, 7\pi/8\pi, \pi, 9\pi/8, 5\pi/4, 11\pi/8, 3\pi/2, 13\pi/8, 7\pi/4, 15\pi/8\}$.

Further, bandpass filter 238 may have removed idler and pump signals. The reduced size of ranges shown on QPSK output signal 316, as compared with QPSK input signal 302, may illustrate a reduction in noise while maintaining phase and amplitude information.

Figure 4:
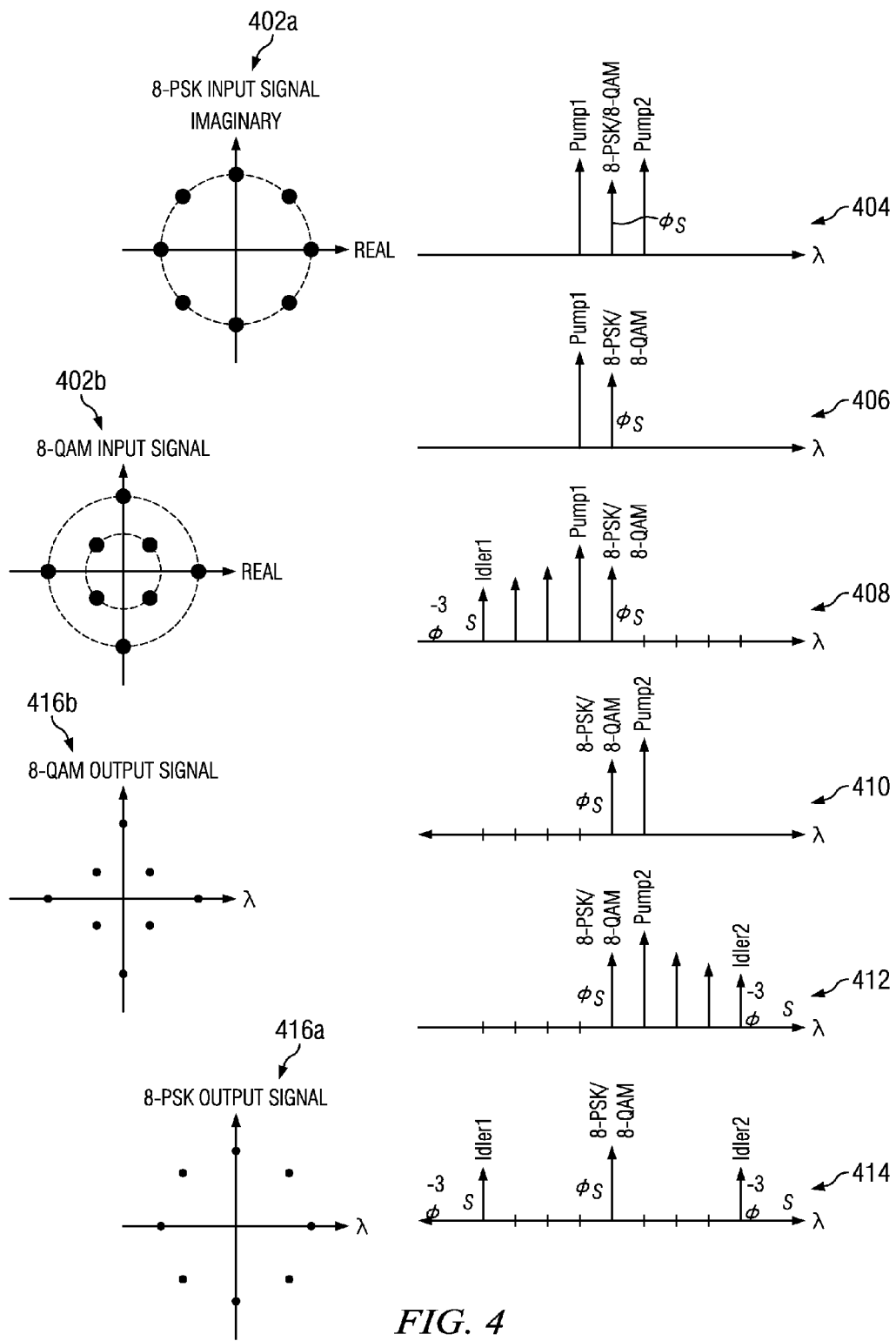
FIG. 4 is a more detailed illustration of the operation of an optical amplifier using an 8-PSK or an 8-QAM input signal.

FIG. 4 is a more detailed illustration of the operation of optical amplifier 200 using an 8-PSK input signal or an 8-QAM input signal. The operation of optical amplifier 200 using an 8-PSK may be the same as the operation using an 8-QAM signal because each signal uses the same angle deviation between two symbols. The operation of optical amplifier 200 may utilize an 8-PSK/8-QAM input signal 402. In one embodiment, 8-PSK/8-QAM input signal 402 may include an 8-PSK input signal 402*a*. In another embodiment, 8-PSK/8-QAM input signal 402 may include 8-QAM input signal 402*b*. 8-PSK/8-QAM input signal 402 may implement input m-PSK/m-QAM signal 202 and its phases are shown via a constellation diagram. The large ranges shown on 8-PSK/8-QAM input signal 402 on each of the signal symbols indicate noise and errors associated with the phases. Diagrams 404, 406, 408, 410, 412, 414 may illustrate diagrams 212, 220, 222, 224, 226, 234, respectively, as expressed through the use of 8-PSK input signals in optical amplifier 200.

Diagram 404 illustrates that Pump1 signal and Pump2 signal are equidistant (or nearly equidistant) from and symmetric around the 8-PSK/8-QAM signal, which includes a phase $\phi_s$. After being selected by wavelength selective processor 216, diagram 406 illustrates that Pump1 and 8-PSK/8-QAM are selected to be passed through optical nonlinear element 218. Upon passing through optical nonlinear element 218, diagram 408 illustrates that an Idler1 signal has been added to the resultant signal. The Idler1 signal and the 8-PSK/8-QAM signal are equidistant (or nearly equidistant) from the Pump1 signal. The Idler1 signal has a conjugate phase, $-3\phi_s$, with respect to the 8-PSK/8-QAM signal phase. Additional idler signals may be produced by optical nonlinear element 218 and are shown in diagram 408. Such idler signals would have longer wavelengths than Idler1 (others, not shown, may have shorter wavelengths) and phase conjugates which may be inappropriate for 8-PSK/8-QAM regeneration and amplification. The selection of the idler signals may depend upon the specific type of m-PSK/m-QAM modulation used to transmit information. In one embodiment, the third idler signals, with conjugate phase $-3\phi_s$, may be used in conjunction with 8-PSK/8-QAM modulation.

Further, after being selected by wavelength selective processor 216, diagram 410 illustrates that Pump2 and 8-PSK/8-QAM signals are selected to be passed through optical nonlinear element 218. Upon passing through optical nonlinear element 218, diagram 412 illustrates that an Idler2 signal has been added to the resultant signal. The Idler2 signal and the 8-PSK/8-QAM signal are equidistant (or nearly equidistant) from the Pump2 signal. The Idler2 signal has a conjugate phase, $-3\phi_s$, with respect to the 8-PSK/8-QAM signal phase. Additional idler signals, with possibly other conjugate phases, may be produced by optical nonlinear element 218 and some are shown in diagram 412. Such idler signals would have phase conjugates which may be inappropriate for 8-PSK/8-QAM regeneration and amplification.

Diagram 414 illustrates the result of adding the resultant signals and selectively blocking the original pump signals and other unused idler signals. Diagram 414 may be the result of the operation of wavelength selective processor 216 and wavelength selective processor 232. In one embodiment, the 8-PSK/8-QAM signal may have been filtered from the resultant signal and the original signal added. The idler signals may maintain their equidistant (or nearly equidistant) and symmetric spacing with respect to the 8-PSK/8-QAM signal and their conjugate phases.

8-PSK/8-QAM output signal 416 illustrates the result of passing the resultant signal through optical nonlinear element 236 for FWM for dual-pump, degenerate phase-sensitive amplification. In one embodiment, 8-PSK/8-QAM output signal 416 may include an 8-PSK output signal 416*a*. In another embodiment, 8-PSK/8-QAM input signal 416 may include 8-QAM input signal 416*b*. Further, bandpass filter 238 may have removed idler and pump signals. The reduced size of ranges shown on 8-PSK/8-QAM output signal 416, as compared with 8-PSK/8-QAM input signal 402, may illustrate the reduction of noise while maintaining the phase and amplitude information.

Figure 5:
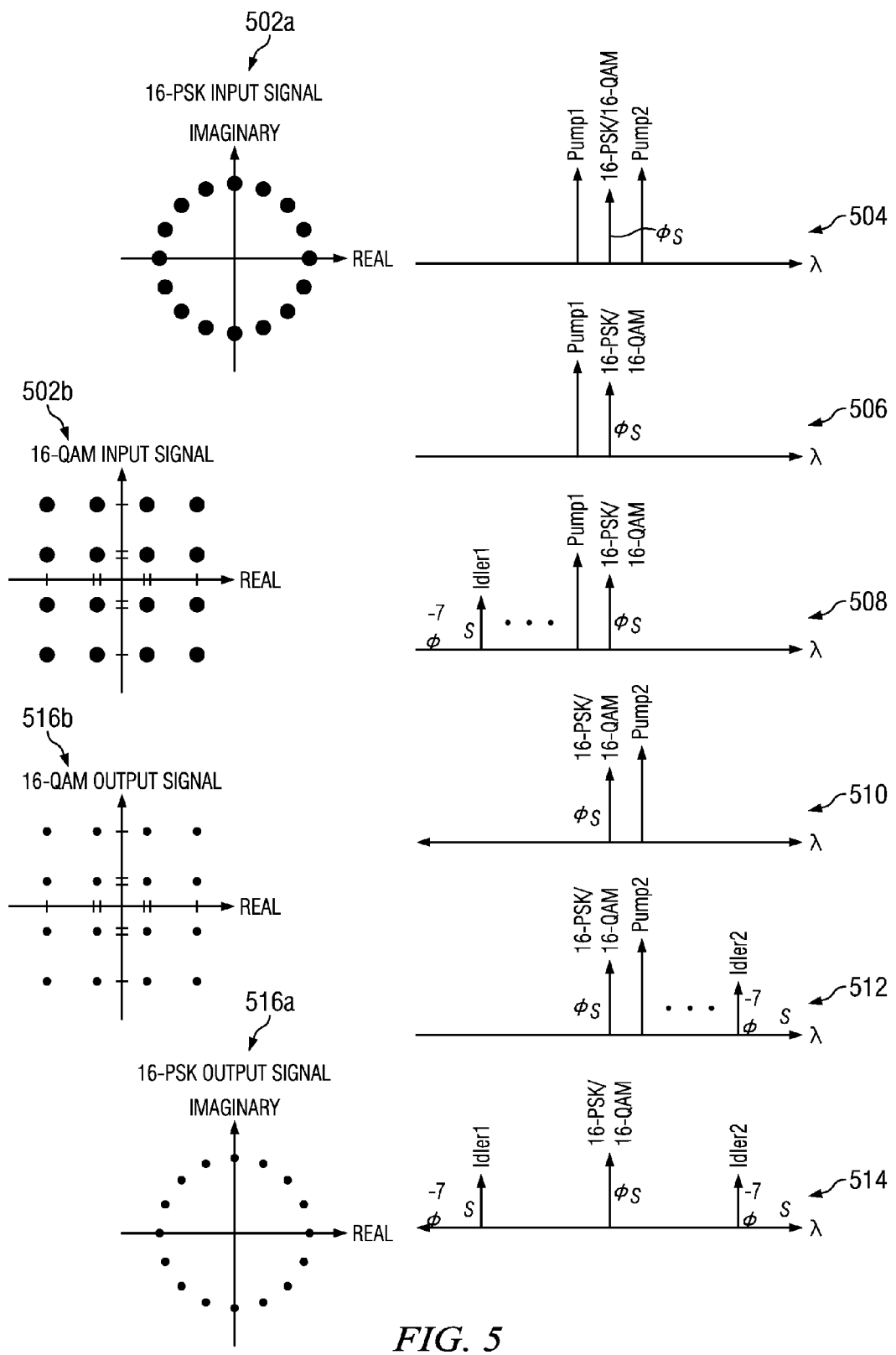
FIG. 5 is a more detailed illustration of the operation of an optical amplifier using a 16-PSK or a 16-QAM input signal.

FIG. 5 is a more detailed illustration of the operation of optical amplifier 200 using an 16-PSK input signal or a 16-QAM input signal. The operation of optical amplifier 200 using an 16-PSK may be the same as the operation using a 16-QAM signal because each signal uses the same angle deviation between two symbols. In one embodiment, 16-PSK/16-QAM input signal 502 may include an 16-PSK input signal 502a. In another embodiment, 16-PSK/16-QAM input signal 502 may include 16-QAM input signal 502b. 16-PSK/16-QAM input signal 502 may implement input m-PSK/m-QAM signal 202 and its phases are shown via a constellation diagram. The large ranges shown on 16-PSK/16-QAM input signal 502 on each of the signal symbols indicate noise and errors associated with the phases. Diagrams 504, 506, 508, 510, 512, 514 may illustrate diagrams 212, 220, 222, 224, 226, 234, respectively, as expressed through the use of 16-PSK/16-QAM input signals in optical amplifier 200.

Diagram 504 illustrates that Pump1 signal and Pump2 signal are equidistant (or nearly equidistant) from and symmetric around 16-PSK/16-QAM signal, which includes a phase $\phi_s$. After being selected by wavelength selective processor 216, diagram 506 illustrates that Pump1 and 16-PSK/16-QAM are selected to be passed through optical nonlinear element 218. Upon passing through optical nonlinear element 218, diagram 508 illustrates that an Idler1 signal has been added to the resultant signal. The Idler1 signal and the 16-PSK/16-QAM signal are equidistant (or nearly equidistant) from the Pump1 signal. The Idler1 signal has a conjugate phase, $-7\phi_s$, with respect to the 16-PSK/16-QAM signal phase. Additional idler signals may be produced by optical nonlinear element 218 but are not shown in diagram 508. Such idler signals would have different wavelengths than Idler1 and phase conjugates which may be inappropriate for 16-PSK/16-QAM regeneration and amplification. The selection of the idler signals may depend upon the specific type of m-PSK/m-QAM modulation used to transmit information. In one embodiment, the seventh idler signals, with conjugate phase $-7\phi_s$, may be used in conjunction with 16-PSK/16-QAM modulation.

Further, after being selected by wavelength selective processor 216, diagram 510 illustrates that Pump2 and 16-PSK/16-QAM are selected to be passed through optical nonlinear element 218. Upon passing through optical nonlinear element 218, diagram 512 illustrates that an Idler2 signal has been added to the resultant signal. The Idler2 signal and the 16-PSK/16-QAM signal are equidistant (or nearly equidistant) from the Pump2 signal. The Idler2 signal has a conjugate phase, $-7\phi_s$, with respect to the 16-PSK/16-QAM signal phase. Additional idler signals, with possibly other conjugate phases, may be produced by optical nonlinear element 218 and some are shown in diagram 512. Such idler signals would have phase conjugates which may be inappropriate for 16-PSK/16-QAM regeneration and amplification.

Diagram 514 illustrates the result of adding the resultant signals and selectively blocking the original pump signals and other unused idler signals. Diagram 514 may be the result of the operation of wavelength selective processor 216 and wavelength selective processor 232. In one embodiment, the 16-PSK/16-QAM signal may have been filtered from the resultant signal and the original signal added. The idler signals may maintain their equidistant (or nearly equidistant) and symmetric spacing with respect to the 16-PSK/16-QAM signal and their conjugate phases.

16-PSK/16-QAM output signal 516 may illustrate the result of passing the resultant signal through optical nonlinear element 236 for FWM for dual-pump, degenerate phase-sensitive amplification. In one embodiment, 16-PSK/16-QAM output signal 516 may include a 16-PSK output signal 516a. In another embodiment, 16-PSK/16-QAM input signal 516 may include a 16-QAM output signal 516b. Further, bandpass filter 238 may have removed idler and pump signals. The reduced size of ranges shown on 16-PSK/16-QAM output signal 516, as compared with 16-PSK/16-QAM input signal 502, may illustrate the reduction of noise while maintaining the phase and amplitude information.

FIG. 6 is an illustration of an example embodiment of an optical amplifier 600. Optical amplifier 600 may implement fully or in part optical amplifier 102 of FIG. 1. Optical amplifier 600 may be configured to regenerate and amplify m-PSK/m-QAM modulated signals that have been further modulated with dual polarizations. The implementation and operation of optical amplifier 600 may be otherwise similar to optical amplifier 200 of FIG. 2. Splitter 604, coupler 606, dual pump source 608, optical circulator 614, amplifier 631, delay 628, bandpass filter 638, splitter 640, feedback unit 642, splitter 630, optical nonlinear element 668, and wavelength selective processors 616, 632 may be implemented wholly or in part by splitter 204, coupler 210, dual pump source 208, optical circulator 214, amplifier 231, delay unit 228, bandpass filter 238, splitter 240, feedback unit 242, splitter 230, optical nonlinear element 236, and wavelength selective processors 216, 232, respectively, of FIG. 2. Further, optical nonlinear elements 650, 652 may be implemented wholly or in part by optical nonlinear element 218 of FIG. 2.

In operation, in a first stage configured to generate conjugate phase signals for dual-polarized ("DP") m-PSK/m-QAM signals, optical amplifier 600 may accept a dual-polarized m-PSK/m-QAM input 602. Dual pump signals from dual pump source 608 may be added to m-PSK/m-QAM input 602 by coupler 606. In order to convert wavelengths for both x- and y-polarizations, optical amplifier 600 may include polarization controller 646 configured to coordinate the passing of such polarizations of input 602 to wavelength selective processor 616. For example, polarization controller 646 may rotate the x-polarization and y-polarization simultaneously while maintaining the orthogonality of x-polarization signal and y-polarization signal. Polarization controller 646 may conduct such rotation because other system components, such as polarization beam splitters 648, 656, may operate assuming that the signal's polarizations are orthogonal and aligned onto polarization beam splitter's orthogonal polarization axes. Furthermore, x-polarization and y-polarization may contain angular drift as the result of noise.

Wavelength selective processor 616 may prepare the signals for wavelength conversion similarly to wavelength selective processor 216 as described in conjunction with FIG. 2 and output two signals: one output signal with the first pump signal and the m-PSK/m-QAM signal, and one output signal with the second pump signal and the m-PSK/m-QAM signal. Each of the output signals may still retain both x-polarization and y-polarization components.

Wavelength selective processor 216 may send the resultant bi-directional signals to optical nonlinear elements 650, 652. Optical amplifier 600 may include polarization beam splitters 648, 656 as well as delay 654 configured to further coordinate the wavelength conversion of the respectively polarized portions of input 602. One such polarized signal (e.g., the y-polarization component) may be passed through optical nonlinear element 650, while the other polarized signal (e.g., the x-polarization component) may be passed through optical nonlinear element 652. Polarization beam-splitters 648, 656 may be configured to accept the separated x-polarization and y-polarization signals from optical nonlinear elements 650, 652 and reconstruct the combined signal, which may include a single source pump signal, one or more idler signals, and the m-PSK/m-QAM signal. Wavelength selective processor 616 may further reassemble the m-PSK/m-QAM optical signal, choose a set of idler signals, and block the original pump signals similar to wavelength selective processor 216 as described in conjunction with FIG. 2.

Delay 654 may be configured to delay one of the polarized signals to be passed through optical nonlinear elements 650, 652. The delay induced by delay 654 may be configurable based upon settings or analysis of dual-polarized m-PSK/m-QAM input 602. Signals with x-polarization and y-polarization that are perfectly in synch or otherwise overlap may experience additional noise side-effects in wavelength conversion or in phase-sensitive-amplification.

In a second stage configured to use phase-sensitive amplification, after the signal is processed by wavelength selective processor 632, the dual-polarized m-PSK/m-QAM optical signal may be routed through another series of polarization controllers 660, 664 and polarization beam splitter 662 configured to separately regenerate and amplify each of the polarized m-PSK/m-QAM optical signal components and subsequently reform the integrated signal. The regeneration and amplification may be accomplished through FWM by optical nonlinear element 668. Polarization controllers 660, 664 may be configured to appropriate route and make orthogonal polarized signals to conform to expected inputs for polarization beam splitter 662 and optical nonlinear element 668. Such activity may include, for example, appropriately transposing the x-polarization and y-polarization components of the signal.

The signal may be subsequently routed to bandpass filter 638 for further processing before being output as dual-polarized m-PSK/m-QAM output 644.

FIG. 7 is an illustration of another example embodiment of an optical amplifier 700. Optical amplifier 700 may be configured to produce the same results as optical amplifier 200 of FIG. 2 but may vary from optical amplifier 200 in terms of its components. Furthermore, optical amplifier 700 may be configured to first generate conjugates of the input signal with bi-directional wavelength conversion and then to conduct dual-pump degenerate phase-sensitive amplification, which may be the same steps taken by the operation of optical amplifier 200. However, optical amplifier 700 may include another embodiment of generating the conjugates of the input signal with bi-directional wavelength conversion.

Optical amplifier 700 may be configured to accept QPSK, 8-PSK, 16-PSK, 8-QAM, or 16-QAM inputs as m-PSK/m-QAM input signal 702. Optical amplifier may include a splitter 704 coupled to m-PSK/m-QAM input signal 702 and configured to split and provide m-PSK/m-QAM input signal 702 to couplers 710, 712. Coupler 710 may be configured to receive the output from Pump1 706 and combine it with m-PSK/m-QAM input signal 702. Coupler 712 may be configured to receive the output from Pump2 708 and combine it with m-PSK/m-QAM input signal 702.

Coupler 710 may be coupled to circulator 714 to output the resultant signal. Circulator 714 may be configured to circulate input-outputs in a counter-clockwise manner, and may be coupled to amplifier 720 and to HNLF 718. Thus, circulator 714 may be configured to transmit input received from coupler 710 to HNLF 718 and to transmit input received from HNLF 718 to amplifier 720.

Coupler 712 may be coupled to circulator 716 to output the resultant signal. Circulator 716 may be configured to circulate input-outputs in a clockwise manner, and may be coupled to amplifier 722 and to HNLF 718. Thus, circulator 714 may be configured to transmit input received from coupler 712 to HNLF 718 and to transmit input received from HNLF 718 to amplifier 722.

Amplifiers 720, 722 may be coupled to the inputs of wavelength selective processor 724. The output of wavelength selective processor 724 may be coupled to HNLF 726, which may be coupled to the input of bandpass filter 728, which may be coupled to m-PSK/m-QAM output signal 730.

Splitter 704, couplers 710, 712, amplifiers 720, 722, optical circulators 714, 716, HNLFs 718, 726, and bandpass filter 728 may be implemented wholly or in part as splitter 204, coupler 210, amplifier 206, optical circulator 214, optical nonlinear element 218, optical nonlinear element 236, and bandpass filter 238, respectively, of FIG. 2 are implemented. Wavelength selective processor 724 may be implemented by any suitable mechanism, such as a microprocessor, microcontroller, DSP, ASIC, or any other digital or analog circuitry.

Pump1 706 and Pump2 708 may each be configured to provide the output of an optical pump signal of a given wavelength and frequency from a source such as a configurable laser. The wavelengths and frequency of the pump signals from Pump1 706 and Pump2 708 may be coordinated. The signal from Pump1 706 and the signal from Pump2 708 may be equidistant (or nearly equidistant) from the m-PSK/m-QAM signal in terms of wavelength. In one example, the signal from Pump1 706 may have a longer wavelength than m-PSK/m-QAM input signal 702. In another example, the signal from Pump2 708 may have a shorter wavelength than m-PSK/m-QAM input signal 702.

The result of passing the combined signal from Pump1 706 and m-PSK/m-QAM input signal 702 through HNLF 718 may be the production of a conjugate signal of m-PSK/m-QAM input signal 702 that is equidistant (or nearly equidistant) from the signal of Pump1 706 in terms of wavelength, as illustrated in diagram 732. The conjugate signal may have a phase that is conjugate to the phase of m-PSK/m-QAM input signal 702, such as $-\phi_s$, $-3\phi_s$, or $-7\phi_s$ wherein m-PSK/m-QAM input signal 702 is modulated using QPSK, 8-PSK/8-QAM, and 16-PSK/16-QAM, respectively.

The result of passing the combined signal from Pump2 708 and m-PSK/m-QAM input signal 702 through HNLF 718 may be the production of a conjugate signal of m-PSK/m-QAM input signal 702 that is equidistant (or nearly equidistant) from the signal of Pump2 708 in terms of wavelength, as illustrated in diagram 734. The conjugate signal may have a phase that is conjugate to the phase of m-PSK/m-QAM input signal 702, such as $-\phi_s$, $-3\phi_s$, or $-7\phi_s$ wherein m-PSK/m-QAM input signal 702 is modulated using QPSK, 8-PSK/8-QAM, and 16-PSK/16-QAM, respectively.

Passing the output of coupler 710 to HNLF 718 while passing the output of coupler 712 to the opposite end of HNLF 718 may thus provide bi-directional waveform conversion. The results of each wavelength conversion may be amplified by amplifiers 720, 722 and provided to wavelength selective processor 724. Thus, the result of operating optical amplifier 700 from receiving m-PSK/m-QAM input signal 702 through producing output of amplifiers 720, 722 may be similar to the result of operating optical amplifier 200 from receiving m-PSK/m-QAM input signal 202 through producing output of amplifier 231. In both optical amplifiers, signals with dual-pump conjugates equidistant (or nearly equidistant) and symmetrically arranged around the source input are provided to a second stage for dual-pump degenerate phase-sensitive amplification. In optical amplifier 700, wavelength selective processor 724 may be further configured to accept the amplified signals, filter or block out the original Pump1 706 and Pump2 708 signals, and produce a resultant signal as shown in diagram 736. Diagram 736 shows that the m-PSK/m-QAM input signal 202 may be equidistant from two signals with conjugate phases. The conjugate phases may be equivalent between the two signals.

Wavelength selective processor 724 may be configured to pass the resultant signals shown in diagram 736 through HNLF 726, which may be configured to perform degenerate phase-sensitive amplification through FWM. The result of such amplification may be an optically amplified signal with reduced phase and amplitude noise or error. Bandpass filter 728 may be configured to remove the pump or conjugate signals and send the resultant signal as m-PSK/m-QAM output signal.

In operation, optical amplifier 700 may receive m-PSK/m-QAM input signal 702, which may contain a signal modulated with, for example, QPSK, 8-PSK, 16-PSK, 8-QAM, or 16-QAM techniques. M-PSK/m-QAM input signal 702 may be split. One copy of the signal may be added to the signal of Pump1. Various embodiments of the resultant signals may be represented in similar fashion to, for example, diagrams 306, 406, or 506 of FIGS. 3-6. Another copy of m-PSK/m-QAM input signal 702 may be added to the signal of Pump2. Various embodiments of the resultant signals may be represented in similar fashion to, for example, diagrams 310, 410, or 510 of FIGS. 3-6.

The combination of m-PSK/m-QAM input signal 702 and the signal of Pump1 706 may be passed through HNLF 718, which may generate an idler or conjugate signal equidistant (or nearly equidistant) as m-PSK/m-QAM input signal 702 from the pump signal. Various embodiments of the resultant signals may be represented in similar fashion to, for example, diagrams 308, 408, or 508 of FIGS. 3-6.

The combination of m-PSK/m-QAM input signal 702 and the signal of Pump1 708 may be passed through HNLF 718, which may generate an idler or conjugate signal equidistant (or nearly equidistant) as m-PSK/m-QAM input signal 702 from the pump signal. Various embodiments of the resultant signals may be represented in similar fashion to, for example, diagrams 312, 412, or 512 of FIGS. 3-6.

Each set of resultant signals may then be amplified through amplifiers 720, 722 and coupled by wavelength selective processor 724. The original pump signals may be filtered. The resultant combination of m-PSK/m-QAM input signal 702 and dual-pump signals, forming phase conjugates with m-PSK/m-QAM input signal 702, may be represented in similar fashion to, for example, diagrams 314, 414, or 514 of FIGS. 3-6.

The resultant signals may be amplified using degenerate phase-sensitive amplification through FWM in HNLF 726. The conjugate and pump signals in the result of such amplification may be removed using bandpass filter 728, and m-PSK/m-QAM output signal 730 may output signals similar to, for example, the signals shown in constellation diagrams 316, 416, or 516 of FIGS. 3-6, depending upon the modulation used.

Figure 8:
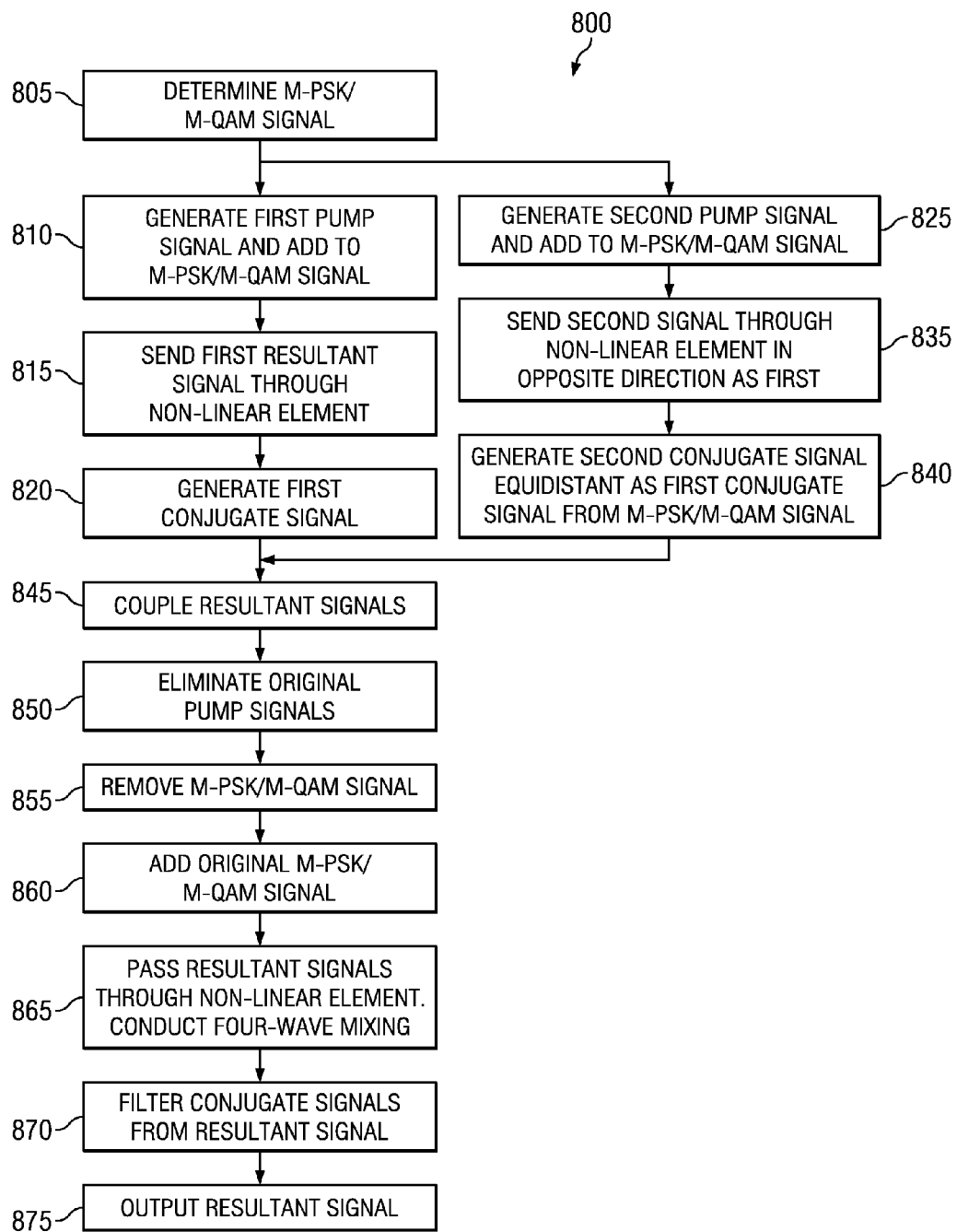
FIG. 8 is an example embodiment of a method for optical signal regeneration and amplification of m-PSK and m-QAM modulation formats.

FIG. 8 is an example embodiment of a method 800 for optical signal regeneration and amplification of m-PSK and m-QAM modulation formats. Method 800 may include using wavelength selective processors and phase-sensitive amplification.

In step 805, an m-PSK signal to be regenerated and amplified may be determined. The m-PSK signal may be modulated using, for example, QPSK, 8-PSK, 16-PSK, 8-QAM, or 16-QAM phase modulation techniques. Compensation for noise and errors in the m-PSK/m-QAM signal and in the equipment used to regenerate and amplify the specific m-PSK/m-QAM signal may be determined and applied. Determinations of equipment of operation of equipment necessary to regenerate and amplify the m-PSK/m-QAM signal may be made. Specifically, the same physical embodiment of a system or optical amplifier may be used to address any one of QPSK, 8-PSK, 16-PSK, 8-QAM, or 16-QAM based signal.

Based on the determination of the signal to be regenerated and amplified through, for example, analysis of the signal, software settings, or user settings, the physical embodiment of the system or optical amplifier may be programmed to handle the type of signal. For example, the idler or conjugate signals generated and selected in steps 820 and 840 may be based upon such programming.

Method 800 may proceed to steps 810 and 825 in parallel. Steps 810-820 and steps 825-840 may be conducted in parallel. Following step 820 and step 840, method 800 may proceed to step 845. In one embodiment, steps 810-820 and 825-840 may be conducted simultaneously.

In step 810, a first pump signal may be generated. The first pump signal may have a wavelength near the m-PSK/m-QAM signal. The difference in wavelength between the first pump signal and a second pump signal, created in step 825, may be the same or nearly the same. In one embodiment, the first pump signal may have a shorter wavelength than the m-PSK/m-QAM signal while the second pump signal may have a longer wavelength than the m-PSK/m-QAM signal. In another embodiment, the first pump signal may have a longer wavelength than the m-PSK/m-QAM signal while the second pump signal may have a shorter wavelength than the m-PSK/m-QAM signal. The pump signals may lie symmetrically around the m-PSK/m-QAM signal in terms of wavelength. The m-PSK/m-QAM signal may be added to the first pump signal. In one embodiment, the pump signal may have no phase elements.

In step 815, the signal resulting from step 810 may be sent through a process for wavelength conversion, such as passing the signal through a nonlinear optical element causing generation of one or more additional idler signals in step 820. The process may include FWM. One of the idler signals may be selected to be included in the signal based on the type of phase modulation used by the m-PSK/m-QAM signal. For example, the first order idler signal may be selected for a determined QPSK signal, a third order idler signal may be selected for a determined 8-PSK/8-QAM signal, and a seventh order idler signal may be selected for a determined 16-PSK/16-QAM signal. Such selections may be based on programming or instructions within a system or optical amplifier implementing method 800, wherein the detection (through analysis or settings, for example) of the type of signal causes a certain idler signal to be selected. The idler signal may be a phase conjugate of the m-PSK/m-QAM signal. For example, where the m-PSK/m-QAM signal has a phase of $\phi_s$, the phase of a first order idler signal may be $-\phi_s$, the phase of a third order idler signal may be $-3\phi_s$, and the phase of a seventh order idler signal may be $-7\phi_s$.

In step 825, a second pump signal may be generated. The second pump signal may have a wavelength near the m-PSK/m-QAM signal. The difference in wavelength between the first pump signal and the second pump signal may be the same or nearly the same. The m-PSK/m-QAM signal may be added to the second pump signal. In one embodiment, the pump signal may have no phase elements.

In step 835, the signal resulting from step 825 may be sent through a process for wavelength conversion, such as passing the signal through a nonlinear optical element causing generation of one or more additional idler signals in step 840. The process may include FWM. The same order idler signal selected in step 820 may be selected in step 835 such that both idler signals are equivalent phase conjugates of the m-PSK/m-QAM signal. Furthermore, the idler signal selected in step 840 may have a wavelength equidistant (or nearly equidistant) as the idler signal selected in step 820 from the m-PSK/ m-QAM signal. Steps 815 and 835 together may comprise bi-directional wavelength conversion.

In step 845, the resultant signals may be coupled together. In step 850, original pump signals, such as those generated in steps 810 and 825, as well as unused idler signals may be eliminated from the resultant signals. In step 855, the m-PSK/m-QAM signal presently within the resultant signals may be removed and in step 860, a copy of the m-PSK/m-QAM signal as originally received may be added. The resulting signal may include the m-PSK/m-QAM signal and the symmetric idler signals with conjugate phases.

In step 865, degenerate phase-specific amplification may be conducted on the resulting signal. Such a process may be conducted by, for example, passing the signal through an optical nonlinear element. FWM may be conducted, resulting in an amplified signal with reduced phase and amplitude noise. In step 870, the idler signals with conjugate phases may be filtered from the amplified signal, and in step 875 the signal may be output.

In one embodiment, method 800 may be conducted on dual-polarized QPSK, 8-PSK, 16-PSK, 8-PSK, and 16-PSK modulated signals. In such an embodiment, the steps of conjugate generation and wavelength conversion, as embodied fully or in part by steps 810-850 may be performed for the two polarized sets (x-polarization and y-polarization) separately. In order to separately perform such conjugation and conversion, the x-polarization and y-polarization may be split using a polarization beam splitter. Furthermore, the polarizations may be made orthogonal.

In another embodiment, the steps of degenerate amplification and signal regeneration, as embodied fully or in part by steps 855-865, may be performed on the combination of the x-polarization and the y-polarization. The polarizations may be made orthogonal, transposed, or otherwise pre-processed or post-processed to conduct steps 855-865.

Method 800 may be implemented using the system and optical amplifiers of FIGS. 1-7, or any other system or device operable to implement method 800. As such, the preferred initialization point for method 800 and the order of the steps comprising method 800 may depend on the implementation chosen. In some embodiments, some steps may be optionally omitted, repeated, or combined. In certain embodiments, method 800 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present invention has been described with several embodiments, various changes and modifications may be suggested to one skilled in the art. It is intended that the present invention encompass such changes and modifications as fall within the scope of the appended claims.

What is claimed is:

1. A method for regenerating and amplifying optical signals, comprising:
   determining a source optical signal to be regenerated and amplified, the source optical signal modulated using a multilevel modulation format;
   adding a first pump optical signal and a second pump optical signal to the source optical signal to yield an intermediate optical signal;
   determining a level of multilevel modulation used to modulate the source optical signal; and
   based on the determined level, selecting a first pair of conjugate optical signals from a plurality of pairs of conjugate optical signals, wherein:
      the first pair comprises a first conjugate optical signal and a second conjugate optical signal, each conjugate optical signal having a phase that is a conjugate of a multiple of the phase of a source optical signal;
      within a given pair of conjugate optical signals, the phase of each conjugate optical signal is equal to the same negative multiple of the phase of the input optical signal; and
      the negative multiple of the phase of the source optical signal for each pair is unique with respect to the other pairs;
   creating the first conjugate optical signal and the second conjugate optical signal from the intermediate optical signal; and
   performing degenerate phase-sensitive amplification utilizing the first conjugate optical signal, the second conjugate optical signal and the source optical signal to yield an output optical signal.

2. The method of claim 1, wherein:
   the difference between a wavelength of the first pump optical signal and a wavelength of the source optical signal comprises a first wavelength distance;
   the difference between a wavelength of the second pump optical signal and a wavelength of the source optical signal comprises a second wavelength distance; and
   the first wavelength distance and the second wavelength distance are approximately equal.

3. The method of claim 1, wherein the phase of the first conjugate optical signal and the phase of the second conjugate optical signal are each equal to a negative multiple of the phase of the source optical signal.

4. The method of claim 1, wherein:
   the difference between a wavelength of the first conjugate optical signal and a wavelength of the source optical signal comprises a first wavelength distance;
   the difference between a wavelength of the second conjugate optical signal and a wavelength of the source optical signal comprises a second wavelength distance; and
   the first wavelength distance and the second wavelength distance are approximately equal.

5. The method of claim 1, further comprising:
   determining that quadrature-phase-shift-keying modulation is used to modulate the source optical signal; and
   based on the determination of modulation, selecting the first conjugate optical signal and the second conjugate optical signal that each have a phase equal to the negative phase of the source optical signal.

6. The method of claim 1, further comprising:
   determining that eight-phase-shift-keying modulation is used to modulate the source optical signal; and
   based on the determination of modulation, selecting the first conjugate optical signal and the second conjugate optical signal that each have a phase equal to three times the negative phase of the source optical signal.

7. The method of claim 1, further comprising:
determining that sixteen-phase-shift-keying modulation is used to modulate the source optical signal; and
based on the determination of modulation, selecting the first conjugate optical signal and the second conjugate optical signal that each have a phase equal to seven times the negative phase of the source optical signal.

8. The method of claim 1, further comprising:
determining that eight-quadrature-amplitude modulation is used to modulate the source optical signal; and
based on the determination of modulation, selecting the first conjugate optical signal and the second conjugate optical signal that each have a phase equal to three times the negative phase of the source optical signal.

9. The method of claim 1, further comprising:
determining that sixteen-quadrature-amplitude modulation is used to modulate the source optical signal; and
based on the determination of modulation, selecting the first conjugate optical signal and the second conjugate optical signal that each have a phase equal to seven times the negative phase of the source optical signal.

10. The method of claim 1, wherein creating a first conjugate signal and a second conjugate signal from the intermediate optical signal comprises:
selecting the combination of the source optical signal and the first pump optical signal as a first partial signal;
selecting the combination of the source optical signal and the second pump optical signal as a second partial signal;
sending the first partial signal through a non-linear optical element in a first direction; and
sending the second partial signal through the non-linear optical element in a second direction, the second direction the opposite of the first direction.

11. The method of claim 1, wherein performing degenerate phase-sensitive amplification comprises performing four-wave mixing utilizing first conjugate signal, the second conjugate signal, and the source optical signal.

12. A method for regenerating and amplifying optical signals, comprising:
determining a source optical signal to be regenerated and amplified, the source optical signal modulated using a multilevel modulation format, wherein the multilevel modulation comprises dual-polarized multilevel modulation;
adding a first pump optical signal and a second pump optical signal to the source optical signal to yield an intermediate optical signal;
creating the first conjugate optical signal and the second conjugate optical signal from the intermediate optical signal, each conjugate optical signal having a phase that is a conjugate of a multiple of the phase of a source optical signal, further comprising;
creating a first conjugate optical signal and a second conjugate optical signal from the intermediate optical signal comprises:
selecting the combination of the source optical signal and the first pump optical signal as a first partial signal;
selecting the combination of the source optical signal and the second pump optical signal as a second partial signal;
splitting the first partial signal into a first x-polarization optical signal and a first y-polarization optical signal;
splitting the second partial signal into a second x-polarization optical signal and a second y-polarization optical signal;
sending the first x-polarization optical signal and the second x-polarization optical signal through a first non-linear optical element in opposite directions; and
sending the first y-polarization optical signal and the second y-polarization optical signal through a second non-linear optical element in opposite directions; and
performing degenerate phase-sensitive amplification utilizing the first conjugate optical signal, the second conjugate optical signal and the source optical signal to yield an output optical signal.

13. A system for regenerating optical signals, comprising:
an input configured to accept a source optical signal modulated using a multilevel modulation format;
a dual-pump source configured to generate a first pump optical signal and a second pump optical signal;
a coupler communicatively coupled to the input and the dual-pump source configured to add the first pump optical signal and the second pump optical signal to the source optical signal to yield an intermediate optical signal;
a wavelength selective processor coupled to a computer-readable medium and configured to accept the intermediate optical signal;
a first non-linear optical element communicatively coupled at two ends to the wavelength selective processor; and
a second non-linear element communicatively coupled to the wavelength selective processor;
wherein:
the wavelength selective processor is configured to send a plurality of portions of the intermediate optical signal through the first non-linear optical element in opposite directions;
the first non-linear optical element is configured to create a first conjugate optical signal and a second conjugate optical signal from the portions of the intermediate optical signal, each conjugate optical signal having a phase that is a conjugate of a multiple of the phase of the source optical signal;
the second non-linear optical element is configured to perform degenerate phase-sensitive amplification utilizing the first conjugate optical signal, the second conjugate optical signal, and the source optical signal to yield an output optical signal; and
the wavelength selective processor includes a wavelength selective switch.

14. The system of claim 13, wherein:
the difference between a wavelength of the first pump optical signal and a wavelength of the source optical signal comprises a first wavelength distance;
the difference between a wavelength of the second pump optical signal and a wavelength of the source optical signal comprises a second wavelength distance; and
the first wavelength distance and the second wavelength distance are approximately equal.

15. The system of claim 13, wherein the phase of the first conjugate optical signal and the phase of the second conjugate optical signal are each equal to a negative multiple of the phase of the input optical signal.

16. The system of claim 13, wherein:
the difference a wavelength of between the first conjugate optical signal and the source optical signal comprises a first wavelength distance;

the difference between a wavelengths of the second conjugate optical signal and a wavelength of the source optical signal comprises a second wavelength distance; and the first wavelength distance and the second wavelength distance are approximately equal.

17. The system of claim 13, wherein the wavelength selective processor is further configured to:

determine a level of multilevel modulation used to modulate the source optical signal; and based on the determined level, select a first pair of conjugate optical signals from a plurality of pairs of conjugate optical signals received from the first non-linear optical element, wherein:

the first pair comprises the first conjugate optical signal and the second conjugate optical signal;

within a given pair of conjugate optical signals, the phase of each conjugate optical signal is equal to the same negative multiple of the phase of the input optical signal; and the negative multiple of the phase of the input optical signal for each pair is unique with respect to the other pairs.

18. The system of claim 13, wherein the wavelength selective processor is further configured to:

determine that quadrature-phase-shift-keying modulation is used to modulate the source optical signal; and based on the determination of modulation, select the first conjugate optical signal and the second conjugate optical signal that each have a phase equal to the negative phase of the input optical signal.

19. The system of claim 13, wherein the wavelength selective processor is further configured to:

determine that eight-phase-shift-keying modulation is used to modulate the source optical signal; and based on the determination of modulation, select the first conjugate optical signal and the second conjugate optical signal that each have a phase equal to three times the negative phase of the input optical signal.

20. The system of claim 13, wherein the wavelength selective processor is further configured to:

determine that sixteen-phase-shift-keying modulation is used to modulate the source optical signal; and based on the determination of modulation, select the first conjugate optical signal and the second conjugate optical signal that each have a phase equal to seven times the negative phase of the input optical signal.

21. The system of claim 13, wherein the wavelength selective processor is further configured to:

determine that eight-quadrature-amplitude modulation is used to modulate the source optical signal; and based on the determination of modulation, select the first conjugate optical signal and the second conjugate optical signal that each have a phase equal to three times the negative phase of the input optical signal.

22. The system of claim 13, wherein the wavelength selective processor is further configured to:

determine that sixteen-quadrature-amplitude modulation is used to modulate the source optical signal; and based on the determination of modulation, select the first conjugate optical signal and the second conjugate optical signal that each have a phase equal to seven times the negative phase of the input optical signal.

23. The system of claim 13, wherein the second non-linear optical element is configured to perform degenerate phase-sensitive amplification by performing four-wave mixing utilizing the first conjugate signal, the second conjugate signal, and the source optical signal.

24. The system of claim 13, further comprising:

a third optical non-linear element;

a first beam splitter communicatively coupled between the wavelength selective processor and a first end of the first optical non-linear element and communicatively coupled between the wavelength processor switch and a first end of the third optical non-linear element; and a second beam splitter communicatively coupled between the wavelength selective processor and a second end of the first optical non-linear element and communicatively coupled between the wavelength selective processor and a second end of the third optical non-linear element;

wherein:

the multilevel modulation comprises dual-polarized multilevel modulation;

the wavelength selective processor is further configured to:

select the combination of the source optical signal and the first pump optical signal as a first partial signal;

send the first partial signal to the first beam splitter;

select the combination of the source optical signal and the second pump optical signal as a second partial signal;

send the second partial signal to the second beam splitter;

the first beam splitter is configured to split the first partial signal into a first x-polarization optical signal and a first y-polarization optical signal;

the second beam splitter is configured to split the second partial signal into a second x-polarization optical signal and a second y-polarization signal;

the first beam splitter and second beam splitter are configured to send the first x-polarization optical signal and the second x-polarization optical signal through the first non-linear optical element in opposite directions; and the first beam splitter and second beam splitter are configured to send the first y-polarization optical signal and the second y-polarization optical signal through the third non-linear optical element in opposite directions.

\* \* \* \* \*